(12) United States Patent
Huang (10) Patent No.: US 6,238,051 B1
(45) Date of Patent: May 29, 2001

(54) PRODUCING COLORED LIGHT BEAMS FROM WHITE LIGHT

(75) Inventor: Austin L. Huang, Arlington, TX (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 09/239,216

(22) Filed: Jan. 28, 1999

(Under 37 CFR 1.47)

(51) Int. Cl.[7] .................................................. G03B 21/14
(52) U.S. Cl. ................................ 353/81; 353/33; 359/634
(58) Field of Search ................................ 353/31, 33, 34, 353/37, 81; 359/629, 634, 636, 637, 638, 639, 640, 833, 834

(56) References Cited

U.S. PATENT DOCUMENTS

| | | | |
|---|---|---|---|
| 5,151,825 | * | 9/1992 | Nicolas .................... 359/634 |
| 6,019,474 | * | 2/2000 | Doany et al. ............ 353/33 |
| 6,113,239 | * | 9/2000 | Sampsell et al. ........ 353/31 |

* cited by examiner

*Primary Examiner*—William Dowling
(74) *Attorney, Agent, or Firm*—Fleshner & Kim, LLP (57) ABSTRACT

A color-separating prism includes first, second, and third component prisms that form first and second adjacent pairs of faces and include nonadjacent faces. The third component prism has a front surface or face. The color-separating prism includes a first reflective layer disposed in part between the first adjacent pair of faces and in part on one nonadjacent face and a second reflective layer disposed in part between the second adjacent pair of faces and in part on another nonadjacent face. The first and second reflective layers are inclined to reflect portions of light incident on the front surface back toward the front surface for total internal reflection. The color-separating may be used to produce narrow-spectral light from broader spectral light. A first portion of a light beam substantially in a first wavelength range is reflected from the first reflective layer back toward the front face of the prism. A second portion of the light beam substantially in a second wavelength range is reflected from the second reflective layer back toward the front face of the prism. The first and second portions are totally internally reflected from the front face. The color-separating prism can be used in display systems.

41 Claims, 7 Drawing Sheets

PRODUCING COLORED LIGHT BEAMS FROM WHITE LIGHT

BACKGROUND OF THE INVENTION

1. Field of the Invention

The present invention relates generally to optical devices and prisms, and, more particularly, to separating a white light beam into several colored light beams.

2. Description of the Related Art

Figure 1:
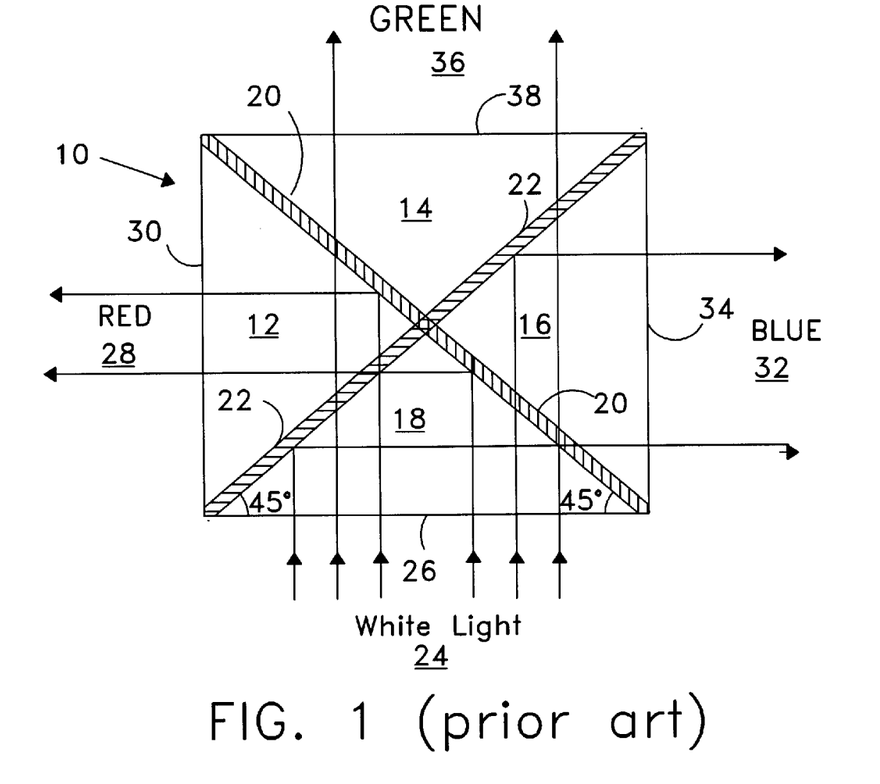
FIG. 1 illustrates a prior art color-separating cross cube.

FIG. 1 illustrates a color-separating prism based on a cross cube 10. The cross cube 10 has a square cross section and is composed of four glass prisms 12, 14, 16, 18. A first reflective layer 20 lies along a first principal diagonal of the cross cube 10. A second reflective layer 22 lies along a second principal diagonal, and intersects the first layer 20 at a right angle. The first and second reflective layers 20, 22 are multi-layers of dichroic material that selectively reflect certain wavelength or color ranges of light.

Referring to FIG. 1, a white light beam 24 enters the cross cube 10 through a first face 26 and is selectively reflected by the first and second reflective layers 20, 22. The first reflective layer 20 reflects red light 28 from the incoming white light beam 24 through a second face 30 of the cross cube 10. The second reflective layer 22 reflects blue light 32 from the incoming white light beam 24 through a third face 34 of the cross cube 10. Green light is not substantially reflected by either the first or second reflective layers 20, 22. Therefore, the green light 36 from the incoming white light beam 24 is transmitted through a fourth face 38 without substantial deviation. The cross cube 10, therefore, separates the incoming white light beam 24 into separate red, blue and green light beams 28, 36, 32, respectively, going in different directions.

Figure 2:
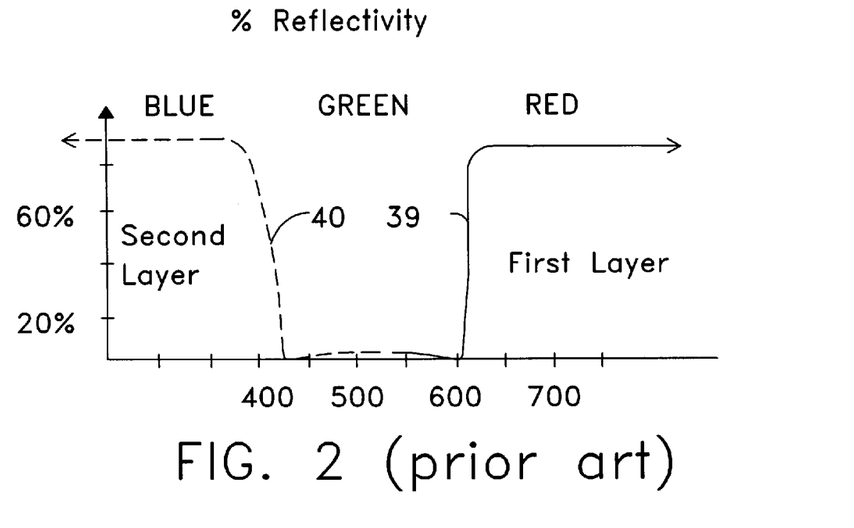
FIG. 2 shows an exemplary percent reflectivity of the color-selective reflective layers of the cross cube in FIG. 1 as a function of wavelength.

FIG. 2 illustrates an exemplary percent reflectivity of the first and second reflective layers 20, 22 of the cross cube 10 in FIG. 1 as a function of wavelength in nanometers (nm). A solid line 39 shows exemplary values for the reflectivity of the first reflective layer 20. The first layer 20 reflects substantially all visible red light and some infrared light at wavelengths greater than about 625 nm. At wavelengths below about 600 nm, the first reflective layer 20 is substantially transparent to visible light. A broken line 40 shows exemplary values for the reflectivity of the second reflective layer 22. The second reflective layer 22 reflects substantially all visible blue light below wavelengths of about 460 nm. Above a wavelength of about 460 nm the second reflective layer 22 is substantially transparent to visible light. The reflectivities of the different dichroic materials making up the first and second layers 20, 22, give the cross cube 10 in FIG. 1 its color-separating properties.

Figure 3:
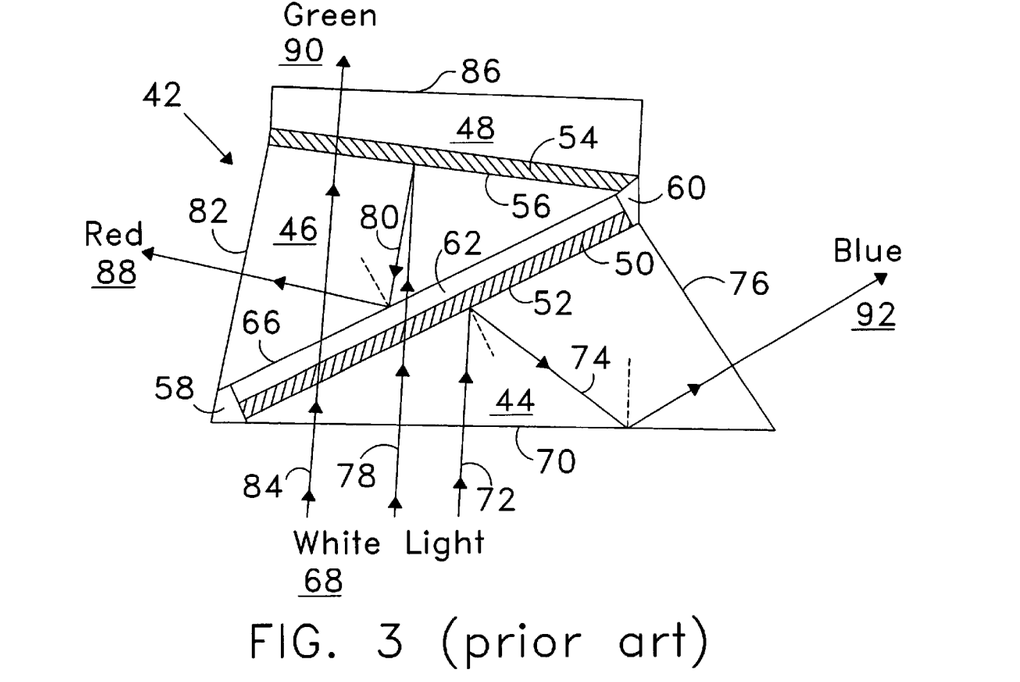
FIG. 3 illustrates a prior art color-separating Philips prism.

FIG. 3 illustrates a second color-separating prism that is generally referred to as a Philips prism 42. The glass elements of the Philips prism 42 include first and second component prisms 44 and 46, and a cover element 48. A first reflective layer 50 is deposited on a back surface 52 of the first component prism 44. A second reflective layer 54 is deposited between a back surface 56 of the second component prism 46 and the cover element 48. Mountings 58, 60 rigidly position the first and second component prisms 44, 46 with respect to each other so that an air gap 62 exists between the first reflective layer 50 and a front surface 66 of the second component prism 46. The Philips prism 42 separates an incoming white light beam 68 into color components, because the first and second reflective layers 50, 54 selectively reflect blue and red light, respectively. The order of light (e.g., red first, then blue or vice versa) is changeable by changing the layers 50 and 54.

The advantage of the Philips prism 42 over the cross cube 10 is that the incident angles of an incoming light ray to the prism interfaces are less steep. Thin-film coaters can optimize the coatings to get better performance than in the cross cube configuration. Referring to FIG. 3, the incoming white light beam 68 passes through a front surface 70 of the first component prism 44. The first reflective layer 50 is constructed of layered dichroic material (e.g., thin film coating) as is the second reflective layer 22 in FIG. 1. An incoming ray of blue light 72 is reflected by the first reflective layer 50 back towards the front surface 70 of the first component prism 44. If the blue light 72 (e.g., a chief ray of a core of light) is substantially perpendicularly incident on the front surface 70, reflected blue light 74 is re-incident on the front surface 70 at an angle that is greater than the critical angle for total internal reflection. Then, the reflected blue light 74 is reflected by the front surface 70 as blue light 92 toward a third surface 76 of the first component prism 44. An incoming ray of red light 78 passes through the first reflective layer 50 without being substantially reflected. The ray of red light 78 is, however, reflected by the second reflective layer 54. If the ray of red light 78 (e.g., collimated light or a chief ray of a core of light) is substantially perpendicularly incident on the front surface 70 of the first component prism 44, a reflected ray of red light 80 is re-incident on the first surface 66 of the second component prism 46 at an angle that is greater than the angle for total internal reflection. Then, the reflected ray of red light 80 is reflected as red light 88 toward a second surface 82 of the second component prism 46. An incoming ray of green light 84 incident on the front surface 70 of the first component prism 44 passes through the first and second reflective layers 50, 54 substantially undeviated. The ray of green light 84 is transmitted through a back surface 86 of the cover element 48 as green light 90. The Philips prism 42 thus separates the incoming white light beam 68 into the red light 88, the green light 90 and the blue light 92, all traveling in different directions.

Referring to FIGS. 1 and 3, the cross cube 10 and the Philips prism 42, respectively, have several inconvenient properties. In the cross cube 10, the first and second layers 20, 22 make 45° angles with respect to the first surface 26. The 45° arrangement simplifies the construction of the cross cube 10, but may make the cross prism 10 inconveniently thick. Also, the reflectivities and transmissivities of the first and second layers 20, 22 may differ for the two polarizations of the incoming white light beam 24, because the light beam 24 is not perpendicularly incident on the first and second reflective layers 20, 22. The reflectivities are often polarization-dependent for non-perpendicular incidence. Further, though the Philips prism 42 in FIG. 3 has less polarization-dependent reflectivities, due to the more perpendicular incidence of the white light beam 68 on the first and second reflective layers 52, 54, this same arrangement may also make the Philips prism inconveniently thick. Moreover, for the cross cube 10, another disadvantage is that the center of the "X" may be projected (e.g., in a projection system) to a screen and seen as a line to a viewer of the screen.

The present invention is directed to overcoming, or at least reducing the effects of, one or more of the problems set forth above.

SUMMARY OF THE INVENTION

In one aspect of the invention, a color-separating prism is provided. The color-separating prism includes first, second, and third component prisms that form first and second adjacent pairs of faces, and include nonadjacent faces. The third component prism has a front surface. The color-separating prism also includes a first reflective layer disposed in part between the first adjacent pair of faces and in part on one nonadjacent face and a second reflective layer disposed in part between the second adjacent pair of faces and in part on another nonadjacent face. The first reflective layer is inclined for reflecting a portion of light incident on the front surface back toward the front surface for total internal reflection.

In another aspect of the invention, a method of producing narrow-spectral light from broader spectral light is provided. The method includes reflecting a first portion of a light beam, substantially in a first wavelength range, off a first reflective layer back toward a face of a prism. The method also includes reflecting a second portion of the light beam, substantially in a second wavelength range, off a second reflective layer back toward the face, and totally internally reflecting the first and second portions off the face.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Specific embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
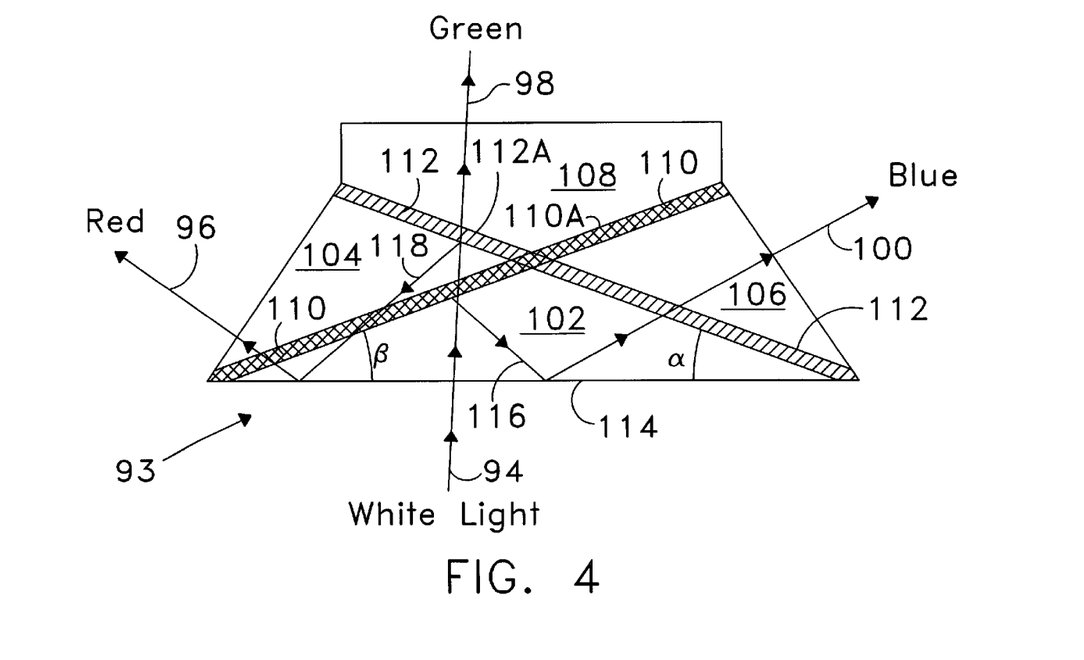
FIG. 4 illustrates a color-separating prism in accordance with an embodiment of the invention.

FIG. 4 illustrates a prism 93 that separates an incoming white or quasi-white light beam 94 into three colored light beams 96, 98, 100 in accordance with an embodiment of the invention. Three component prisms 102, 104, 106 and a cover element 108 form a body of the prism 93. The component prisms 102 and 104, and 102 and 106 include nonadjacent faces and form pairs of opposed adjacent faces. The component prisms 104 and 106 form pairs of opposed adjacent faces that include nonadjacent faces of the prisms 102, 104, and 106 with the cover 108. The cover element 108 can make the optical path traveled by the green light beam 98 more equal to the optical path traveled by the red and blue light beams 96, 100. The cover element 108 is absent in some embodiments. The component prisms 102, 104, 106 and the cover element 108 are constructed from either glass or substantially transparent plastic. First and second reflective and color-selective layers 110, 112 (e.g., thin-film dichroic layers) are layered along the principle joints or interfaces between the opposed adjacent faces of the component prisms 102, 104, 106 (forming pairs of adjacent faces) and the cover element 108 to form an X-shaped cross having substantially oblique included angles. Portions 110A and 112A of the reflective layers 110 and 112, respectively, are layered on faces nonadjacent of the component prisms 102, 104, and 106 to each other. The reflective layers 110, 112 are arranged so that any light incident on the front surface 114 and transmitted to the cover element 108 must pass through both color-selective reflective layers 110, 112. In embodiments not employing the cover element 108, the portions 110A and 112A of the reflective layers 110 and 112 are positioned on top surfaces of the component prism 93.

The first and second reflective layers 110, 112 selectively reflect colors in two substantially non-overlapping wavelength ranges. In one embodiment, the first reflective layer 110 is highly reflective to blue light and reflects substantially all visible light at wavelengths below about 460 nm. Similarly, the second reflective layer 112 is highly reflective to red light and reflects substantially all visible light at wavelengths greater than about 600 nm. In this embodiment, both the first and the second layers 110, 112 are substantially transparent to light between the wavelengths of about 460 and 600 nm, i.e. green light. The first and second reflective layers 110, 112 are constructed of color-selective, layered, dichroic materials, which are well-known in the art. The first and second reflective layers 110, 112 use constructive and destructive interference to reflect preselected wavelength ranges of light. To produce selective reflectance over preselected color or wavelength ranges, the dichroic materials in the first and second reflective layers 110, 112 may be multi-layered. In one embodiment, the reflective layers 110, 112 are made of magnesium fluoride and/or titanium oxide, and are formed by chemical vapor deposition (CVD) and/or sputtering. The optical thickness of the various layers in the first and second reflective layers 110, 112 introduce approximately odd multiple half-wave retardations between different transmitted rays in preselected wavelength ranges to cause destructive interference for transmitted light, and even multiple half-wave and/or quarter-wave retardations to cause constructive interference for reflected light. The first and second color-selective reflective layers 110, 112 can be designed according to known interference techniques to selectively reflect light in different wavelength ranges. In one embodiment, the first and second layers 110, 112 both reflect more than approximately 95% of the incident light 94 in the respective selected wavelength ranges and transmit more than approximately 90% of the light in other wavelength ranges.

It is well-known that thin-film layers in Phillips and X-cube prisms exhibit phase transition regions where anomalies in reflective and/or transmissive performance can occur. Similar performance anomalies can occur with the first and second reflective layers 110, 112. Therefore, to optimize the performance of these layers (e.g., tristimulus performance, polarization control, or contrast), light impinging on the prism 93 may have to be pre-filtered with a filter or filters (e.g., using reflective dichroic filters) having notches in spectral regions corresponding to where these phase transitions occur. These filter or filters may also be used to attenuate one or more regions of the visible spectrum (e.g., green light) relative to other regions (e.g., red or blue light) to achieve better performance of the prism 93, depending on the desired results or on the design of a system incorporating the prism 93.

The multi-layered layers of the first and second reflective layers 110, 112 are available from a variety of commercial distributors and are known in the art as "color-band separators." One distributor is Optical Coating Laboratory, Inc. (OCLI) in Santa Rosa, Calif. A second distributor is Balzers Ltd., 46249 Warm Springs Blvd., Freemont, Calif. 94539. Different choices of the color-selective reflective properties of the first and second reflective layers 110, 112 lead to different embodiments of the prism 93 that separate different wavelength or color ranges of the incoming white light beam 94.

Referring to FIG. 4, the prism 93 is constructed so that light rays 116, 118, reflected by the first and second reflective layers 110, 112, respectively, undergo a second reflection, i.e., a total internal reflection, on the front surface 114 of the component prism 102. The prism 93 combines selective reflection off the first and second reflective layers 110, 112 with a subsequent total internal reflection of the two beams 116, 118 off the front surface 114 to redirect red light 96, green light 98, and blue light 100 beams in separate directions.

Figure 5:
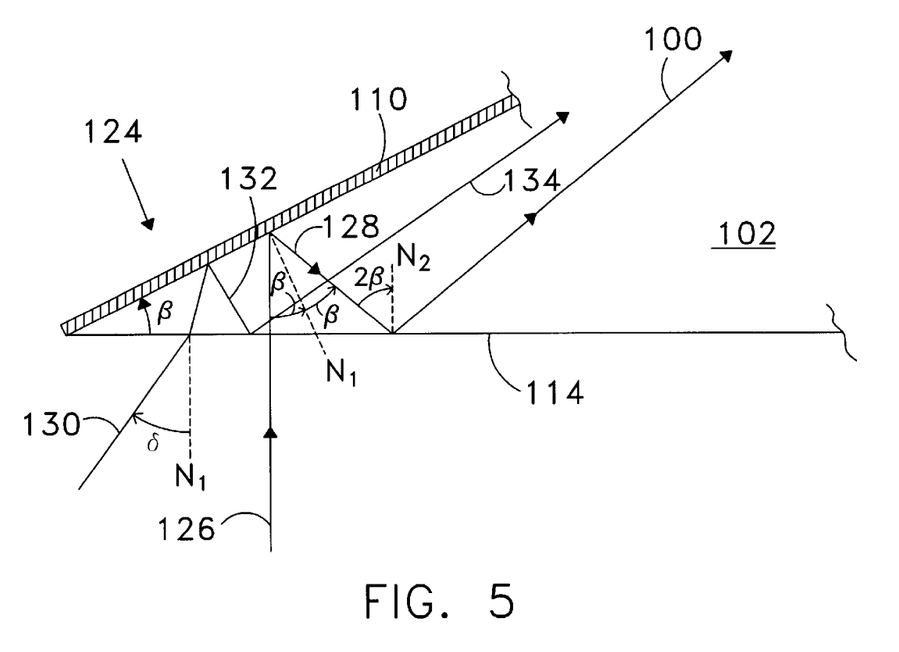
FIG. 5 is a blowup view illustrating total internal reflection of a ray of blue light in the prism in FIG. 4.

Referring to FIGS. 4 and 5, the prism 93 is constructed so that the light beam 94, which is substantially perpendicularly incident on the front surface 114, splits into the red, green, and blue light beams 96, 98, and 100 traveling in separate directions. A portion of a prism 124 in FIG. 5 (i.e., a portion of the component prism 102 in FIG. 4) illustrates the optical path of a ray of blue light 126 (component of the light 94) perpendicularly incident on the front surface 114 of the component prism 102. The ray of blue light 126 makes an angle $\beta$ with respect to a normal vector $N_1$ to the first reflective layer 110. The angle $\beta$ is also the angle of inclination of the first reflective layer 110 with respect to the front surface 114. The first reflective layer 110 produces a reflected blue light ray 128 having the same angle $\beta$ with respect to the normal $N_1$. Therefore, the reflected blue light ray 128 makes an angle $2\beta$ with respect to a normal vector $N_2$ to the front surface 114. The reflected blue light ray 128 is subsequently re-reflected off the front surface 114, as the blue light ray 100, by total internal reflection, to avoid remixing with the incoming light beam 94.

Referring to FIG. 5, the reflected blue light beam 128 is totally internally reflected by the front surface 114 if the angle $2\beta$ is greater than the critical angle for total internal reflection of blue light from the interface formed between the component prism 102 and air. As is well-known in the art, the critical angle for total internal reflection is dependent on the index of refraction of the material forming the component prism 102, the index of refraction of air, and the wavelength of the incident light beam. Because the first reflective layer 110 has an inclination angle $\beta$ with respect to the front surface 114, the reflected beam 128 is totally internally reflected if the inclination angle $\beta$ is greater than one-half the critical angle for total internal reflection of the reflected light 128 from the front surface 114. Similarly, the inclination angle $\alpha$ of the second reflective layer 112 in FIG. 4 with respect to the front surface 114 is greater than one-half the critical angle for totally internally reflecting red light to insure the second reflection of the red light ray 118. The minimum angular inclinations $\beta$ and $\alpha$ of the first and second reflective layers 110, 112 are determined by the requirement that the reflected blue and red light rays 116, 118 in FIG. 4 be totally internally reflected at the front surface 114 to avoid remixing with the incoming white light beam 94.

Referring again to FIGS. 4 and 5, some embodiments of the prism 93 are constructed to separate the colors of a light ray 130 that is not perpendicularly incident on the front surface 114. The light ray 130 may be incident at up to an angle $\delta$ with respect to the normal $N_1$, either due to the angular dispersion of the incoming light beam 94, or due to non-perpendicular incidence of the light beam 94 on the front surface 114. In these embodiments, the inclination $\beta$ of the first reflective layer 110 is designed to insure that the blue component of the light ray 130 produces a reflected light beam 132, which is subsequently totally internally reflected by the front surface 114. The total internal reflection produces an outgoing ray of blue light 134 going in a first different direction than the ray 100. Similarly, the inclination $\alpha$ of the second reflective layer 112 is designed to insure that the red component of the light ray 130 (not shown) will be reflected by the second reflective layer 112, and subsequently totally internally reflected by the front surface 114. This total internal reflection produces a ray of red light (not shown) going in a second different direction than the ray 96. An ordinary person in the art, having the present disclosure, would be able to determine the angles $\alpha$ and $\beta$ so that light making a range of angles with respect to normal $N_1$, to the front surface 114 would be totally internally reflected after partial reflection from the first or second reflective layers 110, 112.

Figure 6:
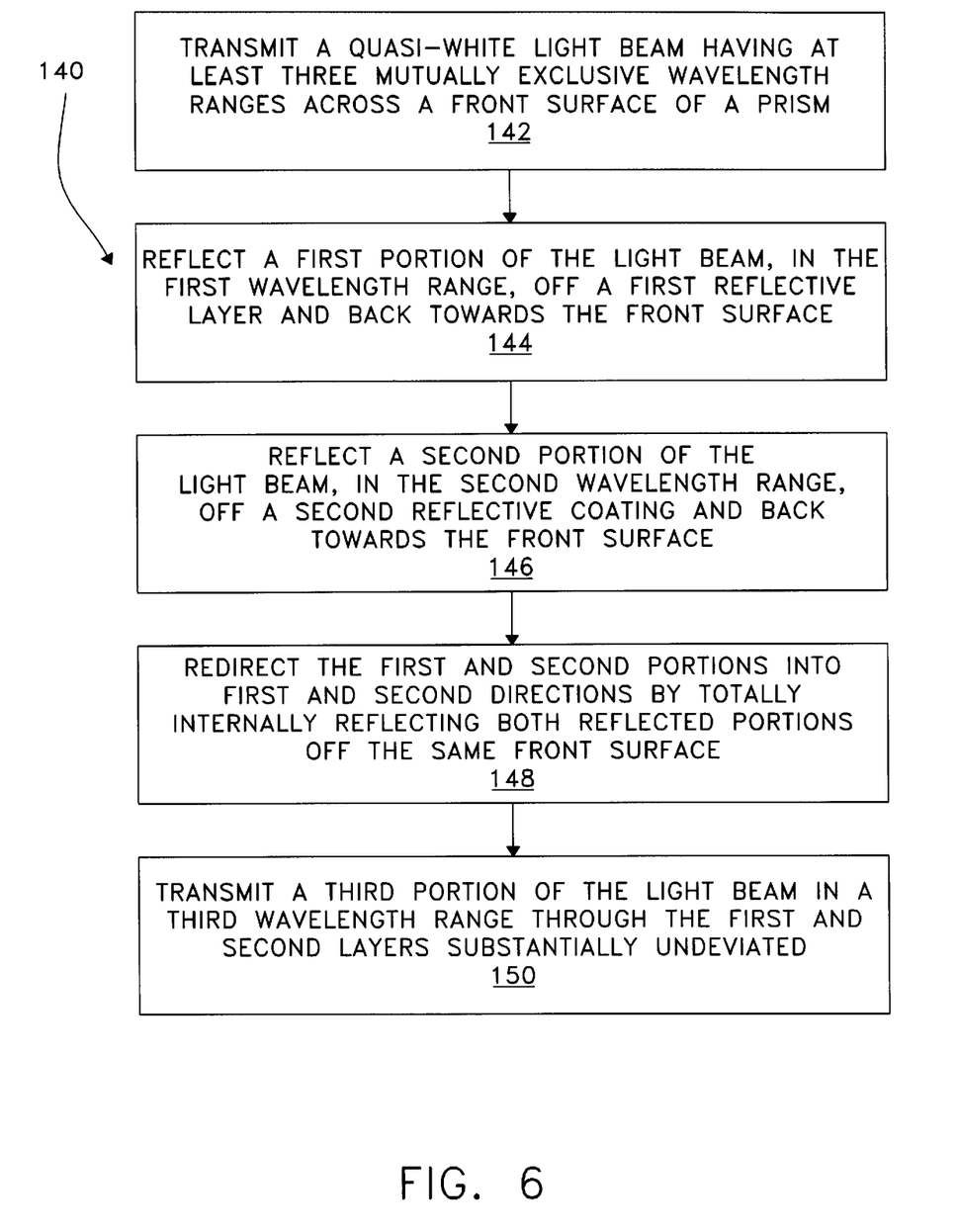
FIG. 6 is a flowchart illustrating a method for separating an incoming white light beam into three colored light beams in accordance with an embodiment of the invention.

FIG. 6 is a flowchart illustrating a method 140 in accordance with an embodiment of the invention for separating the white or quasi-white light beam 94 into three colored light beams directed in different directions, e.g., the red, green, and blue light beams 96, 98, 100 in FIG. 4. At block 142, the light beam 94 is transmitted through the front surface 114 of the prism 93. The light beam 94 has, at least, three substantially non-overlapping and mutually exclusive wavelength ranges of visible light. At block 144, a first reflective layer, e.g., the first reflective layer 110 in FIG. 4, reflects a first portion of the light beam 94, which is in a first wavelength range, back toward the front surface 114 of the prism 93. At block 146, a second reflective layer, e.g., the second reflective layer 112 in FIG. 4, reflects a second portion of the light beam 94, which is in a second wavelength range, back toward the front surface 114 of the prism 93. For example, the reflected first and second portions of the light beam 94 can be the first and second reflected light rays 116, 118 in FIG. 4. At block 148, the reflected first and second portions of the light beam 94 are redirected into first and second directions by total internal reflection off a same surface, e.g., the front surface 114 in FIG. 4. At block 150, the prism 93 transmits a third portion of the light beam 94 in a third wavelength range through the first and second reflective layers 110, 112 and through the body of the prism 93 without substantial deviation.

Figure 7:
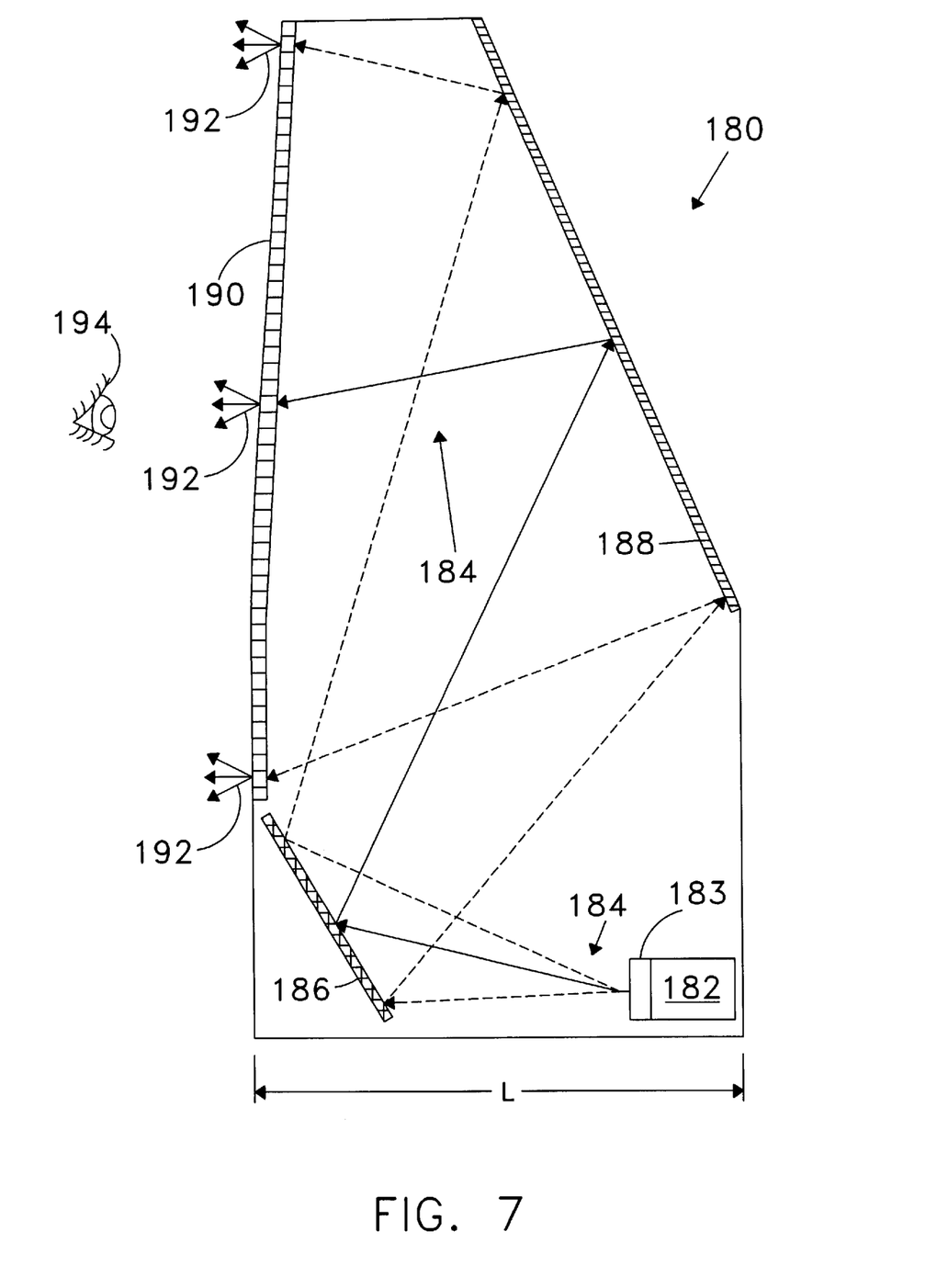
FIGS. 7 and 8 illustrate display systems in accordance with embodiments of the invention.

Projection systems, such as desktop (e.g., in a computer monitor or television display), front, rear, and other projection systems that have a remote screen, can advantageously employ the color-separating prism 93 in accordance with embodiments of the invention. FIG. 7 illustrates a rear projection display system 180 similar to systems described in prior, co-owned U.S. patent application Ser. No. 08/581,108, filed Dec. 29, 1995, entitled "Projecting Images" and U.S. patent application Ser. No. 08/747,190, filed Nov. 12, 1996, entitled "High Efficiency Lamp Apparatus for Producing a Beam Polarized Light," and in European Pat. application No. 96309443.8, EPO 783133A1, filed Dec. 23, 1996, also entitled "Projecting Images," published Jul. 9, 1997, which are incorporated by reference herein in their entirety. The system 180 may be used as part of or in a computer monitor or television display.

The display apparatus 180 includes an image engine 182. The image engine 182 may be similar to image engines described in prior, co-owned U.S. patent application Ser. No. 08/730,818, filed Oct. 17, 1996, entitled "Image Projection System Engine Assembly," which is incorporated by reference herein in its entirety. The image engine 182 includes an image source 183, which outputs image light 184 in response to input signals, for example, electronic, video, or other signals received from an antenna, cable, computer, or controller. The image light 184 reflects off a lower mirror or reflector 186 to a higher mirror or reflector 188. The light 184 is then reflected by the upper mirror or reflector 188 and is directed to a screen 190. The screen 190 may be a diffusive screen or diffuser. The screen 190 scatters the image light 184 as light 192, which a viewer 194 can see as forming an image at the screen 190 of the display system 180.

Figure 8:
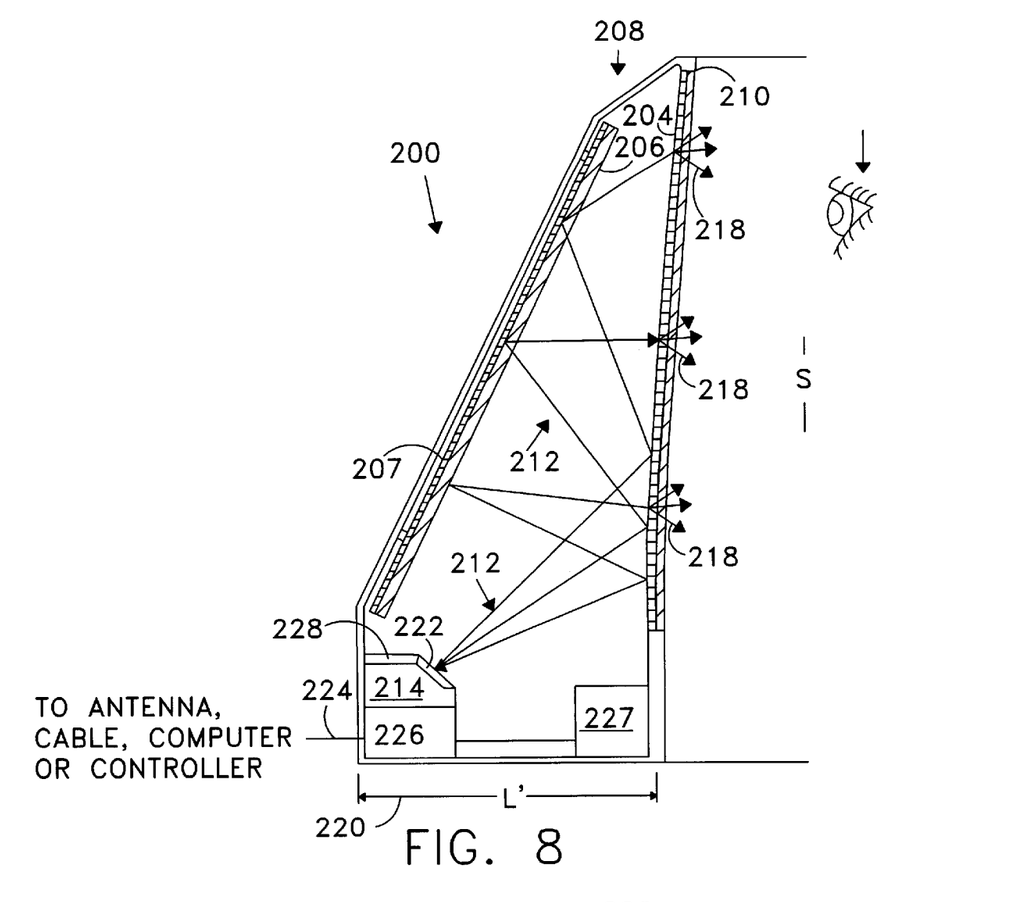

FIG. 8 illustrates another rear projection video display system 200 in which the color-separating prism 93 may be advantageously employed in accordance with an embodiment of the invention. The rear projection video display system 200 is similar (as is the system 180 in FIG. 7) to the systems described in the aforementioned U.S. patent application Ser. No. 08/581,108 and in U.S. patent application Ser. No. 08/880,178, filed Jun. 20, 1997, entitled also "Projecting Images," which is incorporated by reference herein in its entirety. The system 200 may be used as part of or in a computer monitor or television display.

Figure 9:
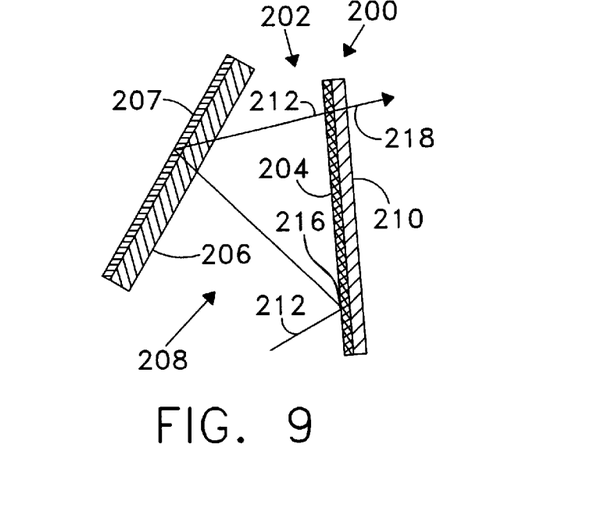
FIG. 9 is a blow-up view illustrating a portion of the rear projection video system in FIG. 7.

FIG. 9 is a blow-up view illustrating a portion 202 of the rear projection video system 200 in FIG. 8. The system 200 includes a reflecting linear polarizer 204 and an chromatic retarder 206 that form a "folded" optical train 208 for projecting an image on a display screen 210 (e.g., a diffusive screen or a diffuser). A portion of image light 212 from an image engine 214 reflects from the reflecting polarizer 204 of the folded optical train 208 at one instance 216, passes through the achromatic retarder 206, reflectors from a reflector 207, and passes through to the display screen 210 at another instance 218. "Optical folding" enables the system 210 to be shallow, i.e., to have a small depth footprint 220 (e.g., L' in FIG. 8 and L in FIG. 7) for an apparently long projection length.

The image engine 214 includes an image source 222 that receives electrical signals through an input cable 224 (possibly via a signal splitter 226) and converts the signals into the primary image beam 212. A sound system 227 can also be included. The signal splitter 226 converts the electrical signals into a video signal and an audio signal. The audio signal is sent to the sound system 227 to produce audible sounds. The signal splitter 226 and the sound system 227 are optional, in which case, video signals can instead be directly sent to the image engine 214 under the control of a controller (not shown).

The types of electrical signals used to create the primary image beam 212 may include television signals, such as those received by an antenna or over cable lines and processed by a video receiver (not shown), and computer video signals generated by a computer system (not shown). The image source 222 may be included in any conventional image projection engine (also true for the image source in the image engine in FIG. 7), such as a liquid crystal display (LCD) projector.

In addition to the image source 222, the image engine also includes a light source 228. The image source 222 must produce polarized light as its output. A wide variety of other types of video systems employ polarization in image formation. The light source 228 generates light incident on the image source 222 to create the image light 212. Examples of light sources that may be used as the light source 228 include those described in the aforementioned U.S. patent application Ser. No. 08/747,190 and in prior, co-owned U.S. patent application Ser. No. 08/771,326, filed Dec. 20, 1996, entitled "Polarized Light Producing Lamp Apparatus That Uses Low Temperature Polarizing Film," which is incorporated by reference herein in its entirety. Other examples of such light sources can be found in U.S. Pat. No. 5,404,076 entitled "Lamp Including Sulfur," and 5,606,220, entitled "Visible Lamp Including Selenium or Sulfur," both issued to Dolan et al., which are also incorporated by reference herein in their entirety.

Figure 10:
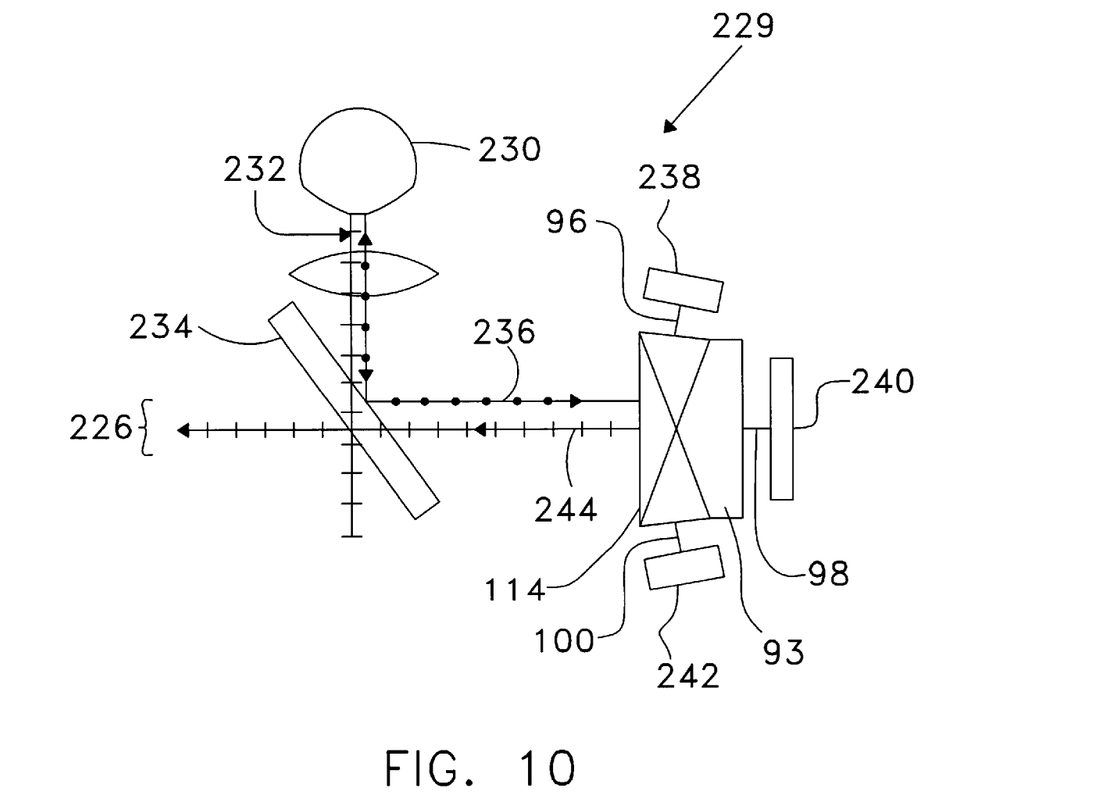
FIG. 10 illustrates an image source used in the rear projection video system in FIG. 8 that employs the color-separating prism in FIG. 4 in accordance with an embodiment of the invention.

FIG. 10 illustrates an image engine 229 that may be used as the image engine 182 in FIG. 7 or as image engine 214 in FIG. 8. The image engine 229 employs the color-separating prism 93 in FIG. 4. The image engine 229 includes a white or quasi-white light source 230 (similar to the light source 228) that produces a light beam 232 incident on a reflecting polarizer 234. The reflecting polarizer 234 produces a light beam 236 of substantially one polarization. The light beam 236 is incident on the front surface 114 of the color-separating prism 93. The color-separating prism 93 directs the red, green, and blue light beams 96, 98, 100 toward first, second, and third reflective imagers 238, 240, 242. In accordance with an embodiment of the invention, the reflective imagers 238, 240, 242 are LCDs that selectively rotate the polarization of reflected light in response to electric signals, such as those described above. For example, the LCDs are reflective LCD arrays that can be constructed from several types of liquid crystals, some of which are in the ferro-electric and the nematic class. It may be possible to use so-called deformable helix and anti-ferro-electric materials as well. The LCDs have two states, a first state that rotates, and a second state that does not rotate, the polarization of light upon reflection therefrom, respectively, to form color-separated images. The reflected color-separated image light from the imagers 238, 240, 242 passes back through the color-separating prism 93 to produce the reflected beam 244 that merges the color-separated image light to form image light. The reflected beam 244 has a polarization substantially orthogonal to the polarization of the original light beam 236 incident on the color-separating prism 93. The reflecting polarizer 234 substantially transmits the reflected beam 244, because of the polarization rotation, and is used to form the primary image beam 212 (see FIG. 8).

Any light that might be reflected back from the color-separating prism 93 in the wrong polarization or color (e.g., polarized as the light 236) will be reflected by the reflecting polarizer 234 toward the light source 230. This unwanted light can be used to "optically pump" certain types of light sources that may be used for the light source 228. Examples of such light sources are disclosed in the aforementioned U.S. patent application Ser. Nos. 08/747,190, and 08/771,326.

The reflecting polarizer 234 may be constructed of double brightness enhancement film (DBEF), a variety of multi-layer optical film (MOF), commercially available from 3M Company, or another wide angle reflecting polarizer. MOF is a type of substantially nonabsorbing polarizer, a reflecting linear polarizer. Use of a substantially nonabsorbing polarizer as the reflecting polarizer 234 may advantageously help reduce the possible occurrence of detrimental thermal effects in the image engine 229, if the light source 230 is a high power light source, by not absorbing the unwanted light and instead directing it back to the light source 230. MOF has an intrinsic optical axis that may be aligned at about a 45° angle to the incident light 232 in order to transmit substantially all light of one polarization and to reflect substantially all light of an orthogonal polarization. The reflecting polarizer 234 can be inclined at other angles with corresponding adjustments to the remaining optics so that substantially one polarization is reflected and the orthogonal polarization is transmitted.

The reflective imagers 238, 240, 242 operate as a type of variably birefringent ½-wave retarder and can be multi-pixel devices (not shown), each pixel can be in a first or a second state. If one of the pixels is in the first state, incident light is substantially unaffected by the pixel. If the pixel is in a second state, the pixel rotates the polarization of the incident light by about 90° upon reflection. The degree of polarization rotation is determined by the amount of voltage applied to the pixels of the LCD layer (not shown) within the reflective imagers 238, 240, 242. Each pixel in the reflective imagers 238, 240, 242 will, at any given instant during a video frame, be either in the first state or the second state, or in between. The pixels in the reflective imagers 238, 240, 242 may be electrically controlled, e.g., with television signals, electrical signals from a computer, or other means, as discussed above and in the aforementioned U.S. patent application Ser. Nos. 08/581,108 and 08/880,178.

The reflective imagers 238, 240, 242 can operate as analog devices (e.g., nematic LCDs) in the sense that the amount of polarization rotation is related to the voltage level applied to each pixel. This allows the intensity of each color to be individually adjusted for each pixel. Alternately, the reflective imagers 238, 240, 242 can operate as logic devices (e.g., ferroelectric LCDs) in the sense that each pixel is either in the first or second states discussed above. Then, the electrical control can perform frame-by-frame color modulation or intra-frame color modulation to produce different time-averaged color brightnesses.

The particular embodiments disclosed above are specific only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A color-separating prism, comprising:
   first, second, and third component prisms that form first and second adjacent pairs of faces, and include nonadjacent faces, the third component prism having a front surface;
   a first reflective layer disposed in part between the first adjacent pair of faces and in part on one nonadjacent face, the first reflective layer being inclined for reflecting a portion of light incident on the front surface back toward the front surface for total internal reflection; and
   a second reflective layer disposed in part between the second adjacent pair of faces and in part on another nonadjacent face.

2. The color-separating prism as set forth in claim 1, wherein the first reflective layer comprises two portions adapted to reflect a first portion of light incident on the front surface back toward the front surface for total internal reflection.

3. The color-separating prism as set forth in claim 1, wherein the second reflective layer is inclined for reflecting a portion of light incident on the front surface back toward the front surface for total internal reflection.

4. The color-separating prism as set forth in claim 1, wherein the first and second adjacent pair of faces comprise opposed faces.

5. The color-separating prism as set forth in claim 1, wherein the first and second reflective layers are inclined substantially unequally.

6. The color-separating prism as set forth in claim 1, wherein the first and second reflective layers are adapted to respectively and substantially reflect light in first and second wavelength ranges.

7. The color-separating prism as set forth in claim 6, wherein the first and the second reflective layers are both adapted to substantially transmit light in a third wavelength range.

8. The color separating prism as set forth in claim 6, wherein the first and second wavelength ranges comprise substantially non-overlapping wavelength ranges.

9. The color-separating prism as set forth in claim 8, wherein quasi-white light substantially perpendicularly incident on the front surface is transmitted therethrough in the first and second wavelength ranges.

10. The color-separating prism as set forth in claim 1, wherein the first, second, and third component prisms comprise one of glass and substantially transparent plastic.

11. The color-separating prism as set forth in claim 1, wherein the first and second reflective layers comprise an X-shaped pattern in cross-section.

12. The color-separating prism as set forth in claim 11, wherein the X-shaped pattern comprises substantially oblique angles.

13. The color-separating prism as set forth in claim 1, wherein the first and second reflective layers comprise dichroic materials.

14. The color-separating prism as set forth in claim 1, wherein the first reflective layer and the front surface comprise an inclination angle greater than approximately one-half the critical angle for total internal reflection of a preselected wavelength range of light from the front surface.

15. The color-separating prism as set forth in claim 14, wherein the second reflective layer and the front surface comprise another inclination angle greater than approximately one-half the critical angle for total internal reflection of a second preselected wavelength range of light from the front surface.

16. The color-separating prism as set forth in claim 1, further comprising a substantially transparent cover adjacent the first and second component prisms.

17. The color-separating prism as set forth in claim 1, wherein the first and second reflective layers are adapted to reflect light of differing wavelengths toward the front surface.

18. The color-separating prism as set forth in claim 1, wherein one of the first and second reflective layers are adapted to reflect portions of light substantially perpendicularly incident on the front surface at an angle greater than approximately the critical angle for total internal reflection from the front surface.

19. A method of producing narrow-spectral light from broader spectral light, comprising:

reflecting a first portion of a light beam, substantially in a first wavelength range, off a first reflective layer back toward a face of a prism;

reflecting a second portion of the light beam, substantially in a second wavelength range, off a second reflective layer back toward the face; and totally internally reflecting the first and second portions from the face.

20. The method as set forth in claim 19, further comprising transmitting a third portion of the light beam, substantially in a third wavelength range, through the prism substantially undeviated.

21. The method as set forth in claim 20, wherein transmitting the third portion comprises transmitting the third portion through both the first and the second reflective layers.

22. The method as set forth in claim 20, wherein the first and second wavelength ranges comprise substantially non-overlapping wavelength ranges.

23. The method as set forth in claim 19, further comprising transmitting the light beam through the face of the prism for reflecting the first and second portions.

24. The method as set forth in claim 19, wherein reflecting the first portion comprises reflecting greater than approximately 95% of light in the first wavelength range.

25. The method as set forth in claim 20, wherein reflecting the second portion comprises reflecting greater than approximately 95% of light in the second wavelength range.

26. The method as set forth in claim 25, wherein reflecting the first portion comprises transmitting greater than approximately 90% of light incident on the first reflective layer and in the second and third wavelength ranges, and wherein reflecting the second portion comprises transmitting greater than approximately 90% of light incident on the second reflective layer and in the first and third wavelength ranges.

27. The method as set forth in claim 19, wherein totally internally reflecting directs the first and second portions in substantially different directions from the direction of the light beam.

28. The method as set forth in claim 21, wherein reflecting the first and second portions of the light beam comprises reflecting first and second portions of quasi-white light.

29. An optical projection system, comprising:

a folded optical train for propagating image light;

an image engine for projecting the image light into the folded optical train;

a color-separating prism located in the image engine for producing a plurality of beams of colored light, the color-separating prism including first, second, and third component prisms that form first and second adjacent pairs of faces and nonadjacent faces, the third component prism having a front surface;

a first reflective layer disposed in part between the first adjacent pair of faces and in part on one nonadjacent face, the first reflective layer being inclined to reflect a portion of light incident on the front surface back toward the front surface for total internal reflection; and a second reflective layer disposed in part between the second adjacent pair of faces and in part on another nonadjacent face.

30. The optical projection system as set forth in claim 29, wherein the folded optical train is comprised in part of a computer monitor.

31. The optical projection system as set forth in claim 29, wherein the folded optical train comprises an achromatic retarder, the achromatic retarder adapted to rotate the polarization of light incident thereon.

32. The optical projection system as set forth in claim 29, wherein the folded optical train comprises a reflecting linear polarizer.

33. The optical projection system as set forth in claim 29, wherein the second reflective layer is inclined for reflecting a portion of light incident on the front surface back toward the front surface for total internal reflection.

34. The optical projection system as set forth in claim 29, wherein the first and second reflective layers are adapted to substantially reflect light in first and second wavelength ranges, respectively.

35. The optical projection system as set forth in claim 34, wherein both the first and the second reflective layers are adapted to substantially transmit light in a third wavelength range.

36. The optical projection system as set forth in claim 34, wherein the first and second wavelength ranges comprise substantially non-overlapping wavelength ranges.

37. The optical projection system as set forth in claim 29, wherein the first and second reflective layers comprise an X-shaped pattern in cross-section that includes substantially oblique angles.

38. The optical projection system as set forth in claim 29, wherein the folded optical train comprises a display screen.

39. The optical projection system as set forth in claim 29, wherein the image engine comprises a reflecting polarizer adapted to direct the image light into the folded optical train.

40. The optical projection system as set forth in claim 39, wherein the reflecting polarizer comprises multilayer optical film.

41. The optical projection system as set forth in claim 29, wherein the folded optical train comprises a reflecting linear polarizer.

* * * * *